United States Patent

Winters

[15] 3,669,852

[45] June 13, 1972

[54] ELECTROPLATING GOLD

[72] Inventor: Earl D. Winters, Quakertown, Pa.

[73] Assignee: Bell Telephone Laboratories, Incorporated, Murray Hill, N.J.

[22] Filed: Oct. 23, 1969

[21] Appl. No.: 868,777

[52] U.S. Cl. ..............................................204/46, 204/277
[51] Int. Cl. ..............................................C23b 5/28
[58] Field of Search ...............204/277, 46, DIG. 3, 109, 110, 204/111

[56] References Cited

UNITED STATES PATENTS

| | | | |
|---|---|---|---|
| 3,475,292 | 10/1969 | Shoushanian | 204/44 |
| R25,883 | 10/1965 | Duva et al. | 204/46 X |
| 2,758,075 | 8/1956 | Swalheim | 204/28 |
| 3,103,474 | 9/1963 | Juda | 204/DIG. 3 |
| 3,149,058 | 9/1964 | Parker et al. | 204/46 |

OTHER PUBLICATIONS

Francis C. Frary; Trans. American Electrochemical Soc., Vol. 23, pp. 40 and 41, (1913).

*Primary Examiner*—G. L. Kaplan
*Attorney*—R. J. Guenther and Edwin B. Cave

[57] ABSTRACT

The removal of dissolved oxygen prior to and during plating from certain electroplating baths such as citrate and phosphate buffered gold cyanide plating baths, by introducing nitrogen gas or a chemical reducing agent such as hydrazine or sulfite ions into the bath, results both in increased plating efficiencies of up to 98 percent and decreased thickness variation of the plated deposit, over the normally encountered current density range.

2 Claims, 6 Drawing Figures

INVENTOR
E. D. WINTERS
BY
ATTORNEY

ELECTROPLATING GOLD

BACKGROUND OF THE INVENTION

1. Field of the Invention

This invention relates to a method for electroplating gold, resulting in increased efficiency of a gold plating bath and decreased thickness variation of its electroplating deposit.

2. Prior Art

In certain electroplating applications such as the gold plating of integrated circuits, it is desirable to rapidly plate a deposit having a small thickness variation. In the deposition of gold beam leads, for example, error in determining the gold thickness can contribute to error in the final silicon thickness, and thus can contribute to uncertainty in the etching time required to separate circuit chips from the slice. Over-etching often leads to destruction of the junction, while under-etching does not isolate circuit chips.

The gold thickness can also be critical in the plating of relatively thin gold deposits used to "metalize" or interconnect electrical components contained in the silicon slices thereby completing the formation of integrated circuits. The maximum allowable thickness is often determined by lateral plating effects which may cause shorts where interlead spacings are small, while the minimum thickness is usually determined by required conductance. In the case of AIM (Air Isolated Monolith) devices the amount of metalizing gold must, of course, be consistent with mechanical strength requirements. In some cases thickness variations have been observed to be only partially attributable to current density variations which are known to be caused by geometry of the electrodes and plating apparatus and by the electrochemical properties of the bath.

Plating time can also be critical. For example, in the formation of beam leads, thick deposits (0.5 mil or greater) and consequently long plating times (typically about 45 to 90 minutes) are required. Such prolonged exposure of photoresist material to the plating solution increases the likelihood and extent of any pattern degradation which may occur.

Plating times are often further prolonged by the fact that in electroplating systems a cathode efficiency of 100 percent is seldom achieved. For example, certain citrate buffered gold cyanide systems have cathode efficiencies of 75 percent to 95 percent over the utilizable current density range. See R. A. Ehrhardt, *Proceedings, The American Electroplaters Society*, 47, 78 (1960).

Unfortunately, for many widely used gold plating baths including the citrate buffered bath mentioned, it has been observed that increasing the current density to effect an increase in plating rate generally results in a degradation of the quality of the plated deposit.

The search continues for ways to rapidly plate a deposit having a small thickness variation.

SUMMARY OF THE INVENTION

The removal of dissolved oxygen prior to and during plating from certain electroplating baths such as citrate and phosphate-buffered gold cyanide plating baths, results both in increased plating efficiencies of up to 98 percent and decreased thickness variation of the plated deposit, over the normally encountered current density range.

Oxygen removal may be achieved by passing a gas free of molecular oxygen through the bath or by introducing a chemical reducing agent into the bath such as hydrazine or sulfite ions, the latter for baths having a pH or 7 or greater.

According to a preferred embodiment, pure gold plating of integrated circuits is carried out using a phosphate-buffered gold cyanide plating bath to which small predetermined amounts of a sulfite-ion containing solution are periodically added according to a predetermined schedule to maintain optimum levels of current efficiency and deposit thickness uniformity.

DETAILED DESCRIPTION OF THE INVENTION

Figure 1:
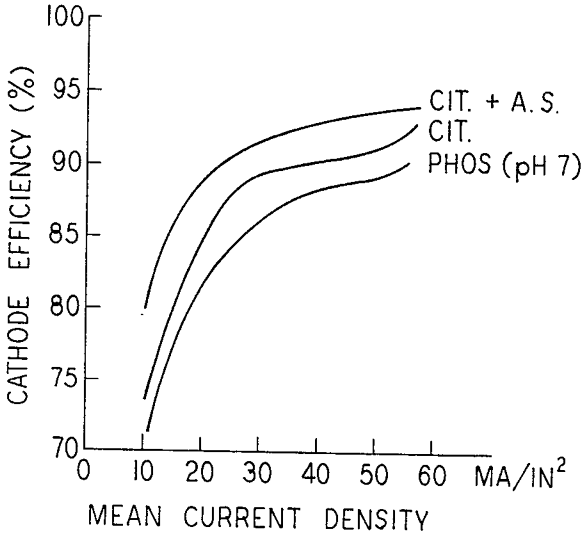
FIG. 1 is a graph of cathode efficiency in percent versus mean current density in milliamps per square inch, for several gold plating baths which may be expected to benefit from the inventive technique.
Figure 2:
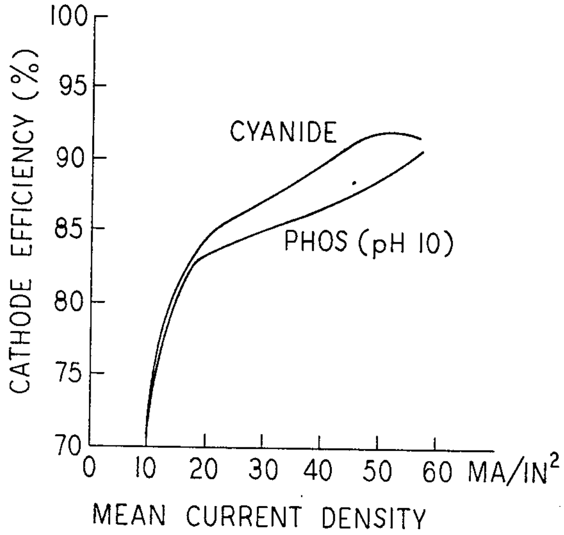
FIG. 2 is a graph similar in all respects to the graph of FIG. 1 for some additional gold plating baths which may be expected to benefit from the inventive technique.
Figure 3:
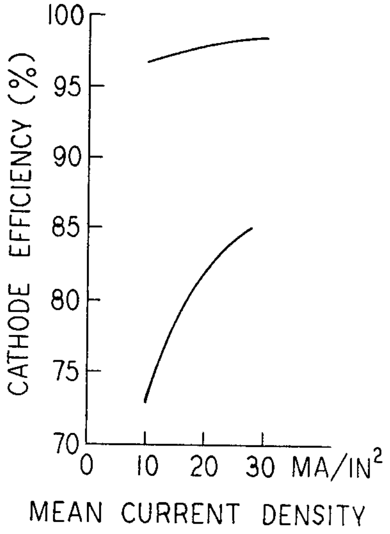
FIG. 3 is a graph of cathode efficiency versus current density for a citrate buffered gold cyanide plating bath to which have been separately introduced air and nitrogen gas.

The plating solutions which may be expected to benefit from the inventive technique include those in which dissolved oxygen is present during electroplating in sufficient quantities to significantly reduce plating efficiency and in which plating efficiency increases with increasing current density of the plating solution. Such solutions include those in which the aurous ion is complexed with the cyanide ion, such as the citrate-buffered, phosphate-buffered and cyanide gold plating baths. Some exemplary compositions of these baths are listed in Table I, and the relationships between current efficiency and current density for these compositions in cells open to ambient air and under conditions of agitation at 65° C are depicted in FIGS. 1 and 2. It may be seen that current efficiency increases with current density over the normally encountered current density range of 10 to 60 milliamps per square inch, and that in general these increases are most pronounced in the often used current density range of 10 to 30 milliamps per square inch.

Other electroplating baths in which this relationship between current efficiency and current density exists also benefit from the inventive technique.

TABLE 1

GOLD PLATING SOLUTIONS

| Name | pH at 25°C | Composition | Grams/ Liter |
|---|---|---|---|
| Citrate | 5 | Potassium Gold Cyanide ($KAu(CN)_2$) | 20 |
| | | Dibasic Ammonium Citrate ($(NH_4)_2C_6O_7H_6$) | 50 |
| Citrate + Ammonium Sulfate | 5 | Potassium Gold Cyanide | 20 |
| | | Dibasic Ammonium Citrate | 50 |
| | | Ammonium Sulfate $(NH_4)_2SO_4$ | 50 |
| Phosphate | 7 | Potassium Gold Cyanide | 20 |
| | | Potassium Phosphate, Dibasic ($K_2HPO_4 \cdot 3H_2O$) | 40 |
| | | Potassium Phosphate, Monobasic ($KH_2PO_4$) | 10 |
| Phosphate | 10 | Potassium | 20 |

| | | | |
|---|---|---|---|
| | | Gold Cyanide | |
| | | Potassium Phosphate, Dibasic | 40 |
| | | Potassium Phosphate, Monobasic | 10 |
| | | Potassium Hydroxide (KOH) | – |
| Cyanide | 13 | Potassium Gold Cyanide | 15 |
| | | Potassium (KCN) | 55 |
| | | Potassium Hydroxide | 5 |

A certain amount of the dissolved oxygen in the plating solutions is generally present as a result of exposure to ambient air. Thus, it may be preferred to remove oxygen prior to the beginning of electrolysis. However, a substantial amount will generally be generated as a product of electrolysis. For example, in the phosphate buffered gold plating solutions already mentioned, it has been observed that the amount of dissolved oxygen initially increases at the rate of about 20 percent per hour of electrolysis at a current density of about 10 milliamps per square inch, for 1 liter of solution and a total current of 15.7 milliamps. Thus, in cases in which oxygen is electrolysis-generated, it is useful to carry out the oxygen removal technique throughout the duration of electrolysis.

It has also been observed that the cathode efficiency for these gold plating solutions is reduced in an amount proportional to the amount of dissolved oxygen present. Therefore, it is generally preferred for optimum cathode efficiencies to remove as much dissolved oxygen as possible.

Oxygen removal may be carried out by any of a number of techniques such as introducing a gas which is chemically inert with respect to the bath and free of molecular oxygen directly into the plating bath. Typical examples are He, Ne, Ar, $N_2$, $CO_2$ and $H_2$. Nitrogen may be preferred for its availability and ease of handling. The amount of such gas is not critical and may easily be determined. A typical quantity for the current density range of 10 to 60 milliamps per square inch would be 1 to 5 liters per minute per liter of solution, generally resulting in an efficiency increase of from about 5 percent to 20 percent.

In many applications, however, such as in electron device manufacture, it may be preferred to remove dissolved oxygen by introducing reducing agents such as hydrazine or a salt of hydrazine, such as $(NH_2)_2H_2SO_4$ or sulfite ions directly into the plating bath, due to their ability to diffuse rapidly throughout the bath. The amount of such reducing ions may be from as little as $10^{-5}$ molar below which not appreciable current efficiency increase results, up to saturation, although the particular species and concentration preferred for a given application will, in general, depend upon the gold plating bath used.

It will be appreciated by those skilled in the art of electroplating that the addition of certain reducing species to various electroplating baths, while removing dissolved oxygen, may result in the production of additional reducible species which may compete with gold ions for reduction by electrolysis at the cathode. It is pointed out, for example, that sulfite ion in a bath having a pH of less than about 7 results in no appreciable increase in current efficiency due to the production of an additional reducible species.

For baths having a pH of 7 or greater, an amount of sulfite ion addition of from $2 \times 10^{-4}$ to 0.01 moles per ampere minute over the current density range of 10 to 60 milliamps per square inch, is preferred. Beyond these ranges optimum current efficiency increases are no longer obtainable.

A hydrazine addition to a bath of the invention of from $1 \times 10^{-4}$ to 0.01 moles per ampere minute over the current range of 10 to 60 milliamps per square inch, is preferred, above which the stability of the bath may become rapidly impaired and below which optimum current efficiency increases are no longer obtainable.

Several examples follow to illustrate the improved efficiencies and thickness uniformities obtainable using various combinations of plating baths and oxygen removal techniques.

EXAMPLE I

A citrate gold solution having the composition shown in Table 1 was used in a nearly closed electrolytic cell to carry out cathode efficiency determinations over the current density range of 10 to 30 milliamps per square inch. Two separate series of determinations were made for the cases in which air and nitrogen, respectively, were continuously introduced into the plating solution beginning 20 minutes prior to electrolysis and continuing through electrolysis. As may be seen from the figure, the lower curve in which air was introduced during electrolysis shows a rapid increase in current efficiency with current density from about 75 percent at 10 milliamps per square inch to 90 percent at 30 milliamps per square inch. For the case of nitrogen introduction, however, the current efficiency has been increased to about 97 percent of 10 milliamps per square inch and about 98 percent at 30 milliamps per square inch. A similar increase in current efficiency was observed for the phosphate buffered and cyanide solutions of Table 1 when subjected to oxygen removal by nitrogen gas introduction. The results thus indicate that the presence of oxygen in these plating systems has a significant effect on current efficiency and its removal by nitrogen introduction not only increases significantly the current efficiency, but also decreases the rate at which current efficiency increases with increasing current density over the range indicated.

EXAMPLE II

Figure 4:
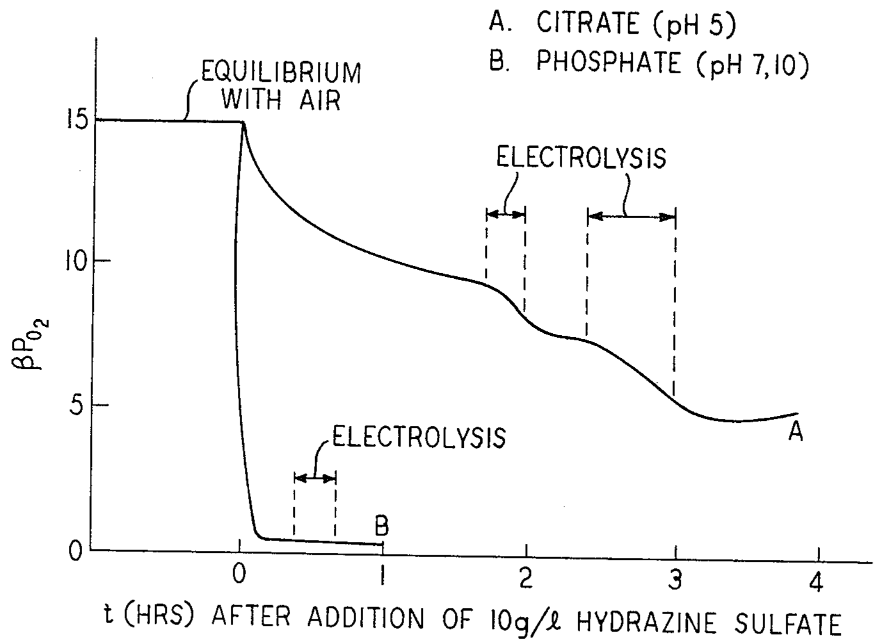
FIG. 4 is a graph of dissolved oxygen content expressed as oxygen partial pressure ($\beta P_{O_2}$) versus time after introducing hydrazine sulfate to citrate and phosphate buffered gold cyanide plating baths respectively.

Ten grams per liter of hydrazine sulfate were added to each of three plating solutions, the citrate buffered and the two phosphate buffered solutions shown in Table 1. Following the addition, the partial pressure of dissolved oxygen expressed as $\beta P_{O_2}$ was continuously monitored and electrolysis carried out intermittently thereafter during the time intervals indicated in FIG. 4. Results are shown in FIG. 4. In the case of the citrate buffered solution, oxygen removal proceeds gradually after the addition is aided somewhat by electrolysis and is essentially complete about 3-¼ hours after addition. For the phosphate buffered solutions, oxygen removal is essentially instantaneous and apparently not affected by electrolysis. During the time intervals indicated, electrolysis was carried out at a current density at 10 milliamps per square inch and cathode efficiencies measured. Results are shown in Table 2.

TABLE 2

| Gold Plating Solution | Current Efficiency (Percent) Before Hydrazine Addition | After |
|---|---|---|
| Phosphate (pH10) | ≈83 | 96 |
| Phosphate (pH7) | ≈83 | 92 |
| Citrate | ≈83 | 90 |

As may be seen, cathode efficiencies increased for the phosphate buffered solutions from about 83 percent to the range of 92 percent to 96 percent, and for the citrate buffered solution to about 90 percent. It is thus seen that the addition of a hydrazine salt to the gold plating baths significantly increases current efficiency.

From the standpoint of the most efficient and controllable use of chemical reducing agents, it may sometimes be preferred to add periodically small predetermined amounts of reducing agent sufficient to maintain the dissolved oxygen content of the bath at an approximately constant low level during electrolysis. The following example illustrates a preferred method of carrying out this oxygen removal technique.

EXAMPLE III

Figure 5:
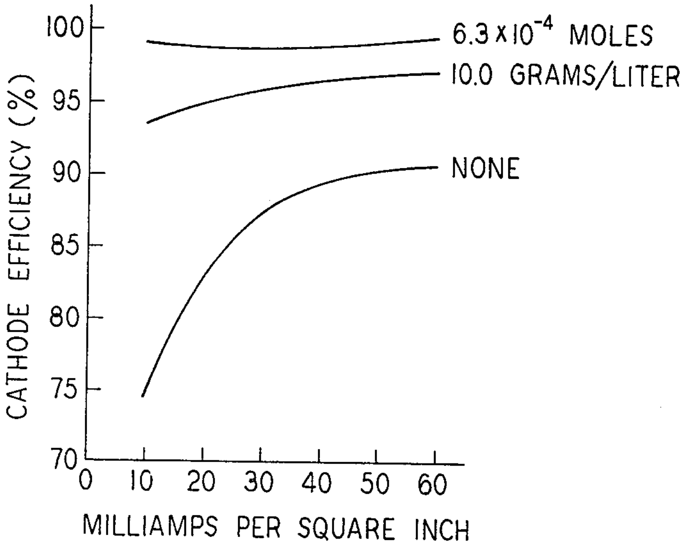
FIG. 5 is a graph of cathode efficiency versus current density for a phosphate-buffered gold cyanide plating bath both before and after oxygen removal by introduction of varying amounts of potassium sulfite.

To the phosphate plating solution having a pH of 7 and the composition shown in Table 1 there were added various amounts of potassium sulfite ($K_2SO_3$) and cathode efficiencies were determined at current densities of 10, 30, and 60 milliamps per square inch in an open cell under conditions of agitation at 65° C. Results are shown in FIG. 5 in which cathode efficiency in percent is plotted versus current density. It is seen that for the bath to which no sulfite addition was made, current efficiency increased from about 75 percent at 10 milliamps per square inch to about 90 percent at 60 milliamps per square inch. Maximum efficiency increases were obtained for sulfite additions of about $6.3 \times 10^{-4}$ moles per liter, that is, an increase to about 98 percent. Adding an excess of sulfite, that is, about 0.07 moles per liter, less than optimum efficiency increases were obtained, that is, increases to 93 percent at 10 milliamps per square inch at 60 milliamps per square inch. It is thus seen from the results of Example III that the controlled addition of small amounts of the chemical reducing agent during electrolysis may be desired to maintain optimum current efficiencies throughout the period of electroplating.

EXAMPLE IV

The phosphate plating bath which was used in Example III was continuously monitored for dissolved oxygen content using a Beckman model 777 analyzer operating on the polarographic principle. Initially, $6.3 \times 10^{-4}$ moles per liter of sulfite were added. Within 3 minutes, the dissolved oxygen concentration of the bath had fallen to below 2 percent of its value at air saturation. Electrolysis was carried out under similar conditions to those of Example III. Whenever a rise in oxygen content was observed, another $6.3 \times 10^{-4}$ moles per liter of potassium sulfite were added. Operating in this fashion, the cathode efficiency was determined to be 96.5 percent and 96.7 percent at 10 and 20 milliamps per square inch, respectively. It is thus seen that current efficiencies may be maintained by this technique which are substantially improved over those obtained by adding an excess of sulfite as in Example III.

EXAMPLE V

Figure 6:
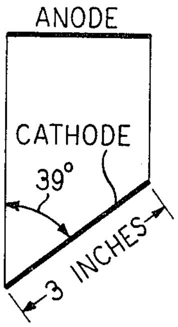
FIG. 6 is a schematic diagram of a Hull cell arrangement in which the thickness variation of electroplated deposit was measured using the inventive method.

A 267 milliliter Hull cell similar in arrangement to that shown schematically in FIG. 6 was used to determine improved thickness variation as a result of the inventive technique. The cathode of the cell formed an angle of 39° with the surface of the anode and was 3 inches long. The phosphate plating solution of Examples III and IV was used and plating was carried out under agitation at 65° C. Deposition was carried out at 250 milliamps for 5 minutes on a brass cathode. Thereafter, the deposit thicknesses were measured along the length of the cathode by means of a beta backscattering technique using a Betascope model NX4. A second cathode was plated under the same conditions except that 3 milliliters of a 10 percent solution ($1.8 \times 10^{-3}$ moles) of potassium sulfite were added prior to plating. The thickness values obtained were used to calculate the values in Table 3 to more readily show the improved results. Assuming that the minimum gold thickness required on the cathode was 100 microinches, deposition would have to proceed for 31 minutes at the position of lowest current density for the case in which no sulfite addition, however, the required 100 microinches could be deposited in only 24 minutes. It is also seen from Table 3 that the amount of deposit which has been obtained at the point of highest current density has increased to 435 microinches for the case without sulfite addition as compared to 359 microinches for the case in which there was a sulfite addition. Thus, the excess thickness buildup at 74 milliamps per square inch which occurs in potassium sulfite is not added exceeds by 21 percent the thickness which results if potassium sulfite is added. It is thus apparent that excluding dissolved oxygen from the plating solution results in a more uniform deposit.

TABLE 3

Calculated Thickness Distribution over Hull Cell Cathode for 100 Microinches of Deposit at Lowest Current Density End

| Current Density (Milliamps per square inch) | Thickness (Microinches) No Sulfite | Sulfite |
|---|---|---|
| 7.8 | 100 | 100 |
| 14.0 | 135 | 135 |
| 23.0 | 182 | 177 |
| 33.0 | 238 | 230 |
| 48.0 | 324 | 287 |
| 74.0 | 435 | 359 |
| Plating Time (Minutes) | 31 | 24 |

What is claimed is:

1. A method for electroplating gold from gold cyanide electroplating baths characterized by passing a gas consisting of nitrogen gas through the electroplating baths prior to and during electrolysis.

2. The method of claim 1 in which the gas is introduced at the rate of 1 to 5 liters per minute per liter of the bath.

* * * * *